(12) United States Patent
Thomason

(10) Patent No.: US 10,740,128 B2
(45) Date of Patent: Aug. 11, 2020

(54) SELECTING A CLOUD FROM A PLURALITY OF CLOUDS FOR A WORKLOAD

(71) Applicant: QUEST SOFTWARE INC., Aliso Viejo, CA (US)

(72) Inventor: James Thomason, Las Vegas, NV (US)

(73) Assignee: QUEST SOFTWARE INC., Aliso Viejo, CA (US)

(*) Notice: Subject to any disclaimer, the term of this patent is extended or adjusted under 35 U.S.C. 154(b) by 205 days.

(21) Appl. No.: 14/706,060

(22) Filed: May 7, 2015

(65) Prior Publication Data
US 2016/0330138 A1 Nov. 10, 2016

(51) Int. Cl.
*H04L 29/08* (2006.01)
*G06F 9/455* (2018.01)

(52) U.S. Cl.
CPC ........ *G06F 9/45558* (2013.01); *H04L 67/10* (2013.01); *G06F 2009/4557* (2013.01); *G06F 2009/45595* (2013.01)

(58) Field of Classification Search
CPC ......... G06F 9/45558; G06F 2009/4557; G06F 2009/45595; H04L 67/10
See application file for complete search history.

(56) References Cited

U.S. PATENT DOCUMENTS

| | | | | |
|---|---|---|---|---|
| 8,959,195 B1* | 2/2015 | Niranjan | ............. | H04L 41/5009 709/223 |
| 9,015,324 B2* | 4/2015 | Jackson | ................ | G06F 9/5027 709/201 |
| 9,276,816 B1* | 3/2016 | Conte | ................ | H04L 41/0893 |
| 9,979,780 B1* | 5/2018 | Faibish | ............... | H04L 67/1012 |
| 2013/0132457 A1* | 5/2013 | Diwakar | ............... | G06F 9/5072 709/201 |
| 2013/0268799 A1* | 10/2013 | Mestery | ................. | H04L 67/10 714/4.2 |
| 2013/0346543 A1* | 12/2013 | Benantar | ............... | G06F 9/5055 709/217 |
| 2014/0278807 A1* | 9/2014 | Bohacek | ............ | G06Q 30/0206 705/7.35 |
| 2015/0067171 A1* | 3/2015 | Yum | ................... | H04L 67/2809 709/226 |
| 2015/0142978 A1* | 5/2015 | Anderson | ........... | H04L 41/5019 709/226 |
| 2015/0302440 A1* | 10/2015 | Monden | ............. | G06Q 30/0206 705/7.35 |
| 2016/0127447 A1* | 5/2016 | Jiang | ....................... | H04L 67/06 709/203 |

(Continued)

*Primary Examiner* — Viet D Vu
(74) *Attorney, Agent, or Firm* — Maschoff Brennan

(57) ABSTRACT

A cloud broker receives a container from a client device. The container includes a software application and metadata. The cloud broker instructs a first cloud hosting facility to execute the container at a performance level specified by the metadata. The cloud broker determines first metrics when the first cloud hosting facility is executing the container. The cloud broker instructs a second cloud hosting facility to execute the container at the performance level specified by the metadata. The cloud broker determines second metrics when the second cloud hosting facility is executing the container. The cloud broker automatically selects a particular cloud hosting facility to host the container based at least partly on the first metrics and the second metrics.

20 Claims, 7 Drawing Sheets

(56) References Cited

U.S. PATENT DOCUMENTS

2016/0147522 A1* 5/2016 Dimitrakos ............... G06F 8/61
                                                     717/174
2016/0260095 A1* 9/2016 Ford .................... G06Q 20/401
2016/0261684 A1* 9/2016 Khalaf ................ H04L 67/1002
2017/0213266 A1* 7/2017 Balestrieri .......... G06F 9/45558

* cited by examiner

600

```
┌─────────────────────────────────────────────────────────────────────────┐
│ RECEIVE A FIRST CONTAINER THAT INCLUDES A FIRST SOFTWARE APPLICATION AND │
│       FIRST METADATA SPECIFYING A MINIMUM PERFORMANCE LEVEL              │
│                                 602                                      │
└─────────────────────────────────────────────────────────────────────────┘
                                     ↓
┌─────────────────────────────────────────────────────────────────────────┐
│ DETERMINE FIRST METRICS DURING EXECUTION OF THE FIRST CONTAINER BY A FIRST │
│                         CLOUD HOSTING FACILITY                           │
│                                 604                                      │
└─────────────────────────────────────────────────────────────────────────┘
                                     ↓
┌─────────────────────────────────────────────────────────────────────────┐
│ DETERMINE SECOND METRICS DURING THE EXECUTION OF THE FIRST CONTAINER BY  │
│                     A SECOND CLOUD HOSTING FACILITY                      │
│                                 606                                      │
└─────────────────────────────────────────────────────────────────────────┘
                                     ↓
┌─────────────────────────────────────────────────────────────────────────┐
│  RECEIVE A SECOND CONTAINER THAT INCLUDES A SECOND SOFTWARE APPLICATION  │
│                          AND SECOND METADATA                             │
│                                 608                                      │
└─────────────────────────────────────────────────────────────────────────┘
                                     ↓
┌─────────────────────────────────────────────────────────────────────────┐
│ DETERMINE THIRD METRICS DURING THE EXECUTION OF THE SECOND CONTAINER BY  │
│                      THE FIRST CLOUD HOSTING FACILITY                    │
│                                 610                                      │
└─────────────────────────────────────────────────────────────────────────┘
                                     ↓
┌─────────────────────────────────────────────────────────────────────────┐
│ DETERMINE FOURTH METRICS DURING THE EXECUTION OF THE SECOND CONTAINER    │
│                   BY THE SECOND CLOUD HOSTING FACILITY                   │
│                                 612                                      │
└─────────────────────────────────────────────────────────────────────────┘
                                     ↓
┌─────────────────────────────────────────────────────────────────────────┐
│    SELECT ONE OF THE FIRST CLOUD HOSTING FACILITY OR THE SECOND CLOUD    │
│  HOSTING FACILITY TO HOST THE FIRST CONTAINER BASED AT LEAST PARTLY ON THE │
│    FIRST METRICS, THE SECOND METRICS, THE THIRD METRICS, AND THE FOURTH  │
│                                METRICS                                   │
│                                 614                                      │
└─────────────────────────────────────────────────────────────────────────┘
                                     ↓
┌─────────────────────────────────────────────────────────────────────────┐
│    SELECT ONE OF THE FIRST CLOUD HOSTING FACILITY OR THE SECOND CLOUD    │
│   HOSTING FACILITY TO HOST THE SECOND CONTAINER BASED AT LEAST PARTLY ON │
│   THE FIRST METRICS, THE SECOND METRICS, THE THIRD METRICS, AND THE FOURTH │
│                                METRICS                                   │
│                                 616                                      │
└─────────────────────────────────────────────────────────────────────────┘
```

FIG. 6

SELECTING A CLOUD FROM A PLURALITY OF CLOUDS FOR A WORKLOAD

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cloud computing is a term that refers to deploying groups of hardware servers and software that enable multiple clients to execute in such a way that each client has their own, compartmentalized portion of the cloud computing environment (often simply referred to as "the cloud"). Cloud computing enables resources to be shared to achieve economies of scale and maximize the effectiveness of the shared resources. Cloud resources are shared by multiple users of multiple clients and are also dynamically allocated on demand. For example, a cloud computer facility that serves European users during European business hours with a specific application (e.g., financial software) may reallocate the same resources to serve North American users during North American business hours with a different application (e.g., a web server). With cloud computing, multiple users can access a single server to retrieve and update their data without purchasing licenses for different applications. By using clouding computing facilities rather than purchasing dedicated hardware and software, organizations pay only for the computing resources that they actually use.

However, with multiple cloud facilities from multiple cloud providers to choose from, organizations may find it difficult to make an "apples-to-apples" comparison among each of the multiple cloud facilities. For example, one cloud facility may provide performance metrics and a service level agreement using one set of metrics (e.g., peak throughput) while another cloud facility may provide performance metrics or a service level agreement using another set of metrics (e.g., average throughput), making direct comparisons of the two cloud facilities difficult. Organizations may find it difficult to identify the specific cloud facility that provides, for the organization's computing requirements, the highest performance at the lowest price.

SUMMARY

This Summary provides a simplified form of concepts that are further described below in the Detailed Description. This Summary is not intended to identify key or essential features and should therefore not be used for determining or limiting the scope of the claimed subject matter.

A cloud broker receives a container from a client device. The container includes a software application and metadata. The cloud broker instructs a first cloud hosting facility to execute the container at a performance level specified by the metadata. The cloud broker determines first metrics when the first cloud hosting facility is executing software included in the container (also referred to as "executing the container"). The cloud broker instructs a second cloud hosting facility to execute the container at the performance level specified by the metadata. The cloud broker determines second metrics when the second cloud hosting facility is executing the container. The cloud broker automatically selects a particular cloud hosting facility to host the container based at least partly on the first metrics and the second metrics.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 6 is a flowchart of a process that includes selecting a cloud hosting facility according to some embodiments.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices, as well as various input and output (I/O) devices, such as a keyboard, a mouse, touchscreen and/or video display. The information handling system may also include one or more buses operable to transmit communications between the various hardware components.

With multiple cloud facilities from multiple cloud providers to choose from, a cloud broker (also referred to as a cloud marketplace) may enable organizations to make standardized price/performance comparisons between multiple cloud facilities. Organizations with decoupled, distributed services, may use a cloud broker (or cloud marketplace) to identify a specific cloud facility appropriate for each service. For example, an organization may use a human resources (HR) software service, a finance (e.g., accounts receivable etc.) software service, an email service, a website hosting service, etc. The cloud broker may identify a cloud facility that is appropriate (e.g., highest performance for the lowest cost) for each service and configure the organization to use a first cloud facility to host the HR software service, a second cloud facility to host the finance software service, and a third cloud facility to host the email service and the website hosting service.

Figure 1:
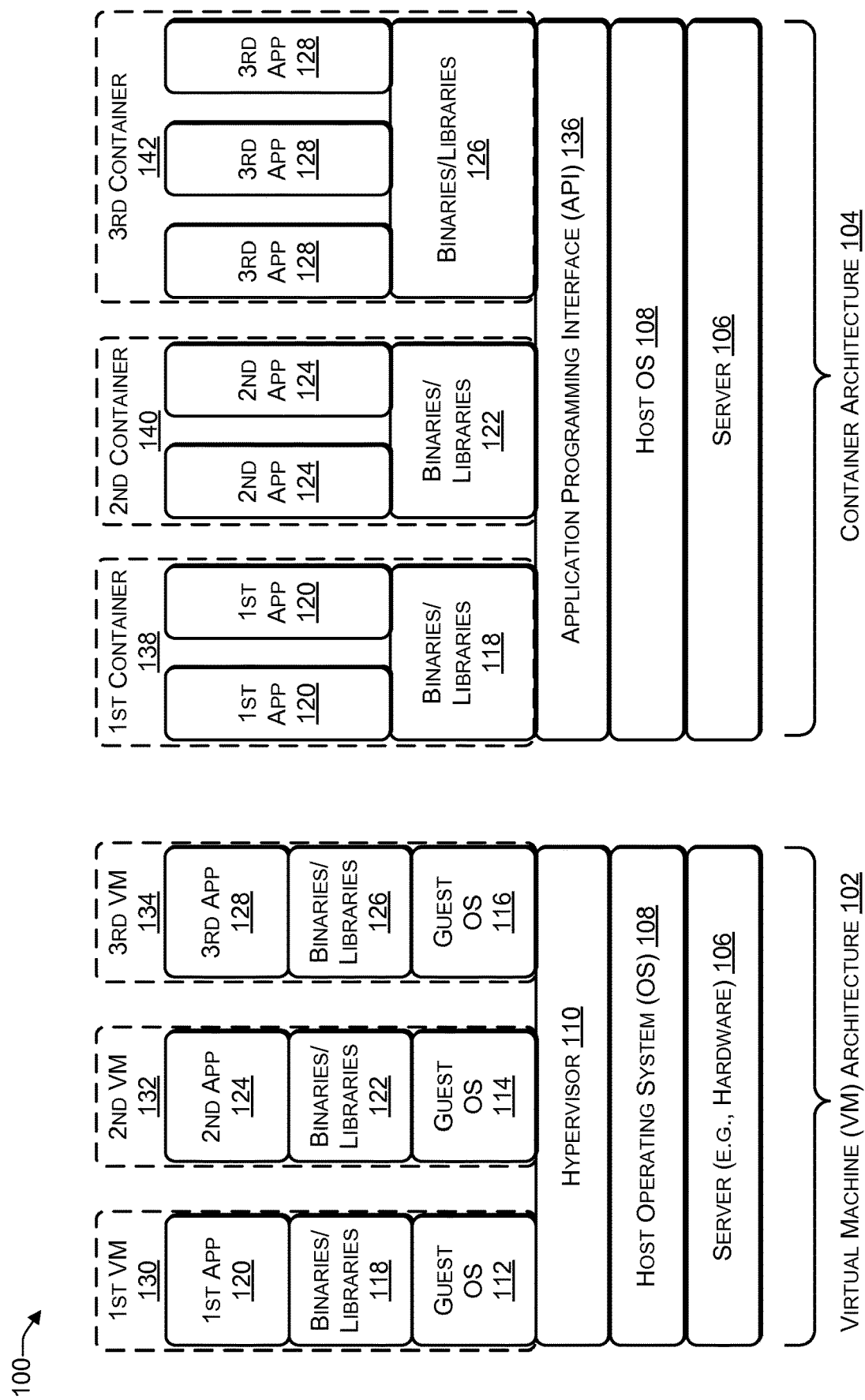
FIG. 1 is a block diagram illustrating an architecture of a virtual machine and an architecture of a container according to some embodiments.

FIG. 1 is a block diagram illustrating a virtual machine (VM) architecture 102 and a container architecture 104 according to some embodiments. VMs and containers (e.g., Docker, Rocket or other similar container architectures) enable software services (or microservices) to be compartmentalized for use with cloud facilities.

A VM is a software implementation of a physical machine (e.g., a computer that includes physical hardware and software). The VM executes software programs in a manner similar to the way that a physical machine executes software programs. There are two types of VMs, system VMs and process VMs. A system VM provides a software emulation of a complete system architecture to support the execution of an operating system (OS), applications, etc. A system virtual machine may emulate a particular type of computer architecture and enable multiple instances of the VMs to execute. Thus, an organization may use VMs executing in a cloud facility to execute the software applications used by the organization. A process VM executes a single program, as the VM supports a single process. Process VMs may be used to provide program portability and flexibility.

The VM architecture 102 illustrates an example of an architecture for executing multiple VMs. It should be understood that, depending on the application, other components may be added or deleted for the components illustrated in the VM architecture 102. The VM architecture includes a server 106 (e.g., physical computer hardware), a host OS 108, and a hypervisor 110. The hypervisor 110 creates and manages the execution of multiple guest OSs that are used by multiple VMs. For example, the hypervisor 110 may create and manage the execution of a guest OS 112, a guest OS 114, and a guest OS 116. The guest OSs 112, 114, and 116 may be the same OS as the host OS 108 or at least one of the guest OSs 112, 114, and 116 may be different from the host OS 108. In some cases, at least two of the guest OSs 112, 114, and 116 may be different from each other. For example, the guest OSs 112, 114, and 116 may include different versions of Microsoft® Windows® (e.g., Windows XP, Windows 7, Windows 8, etc.), different version of Linux, different versions of another OS, or any combination thereof. Each of the guest OSs 112, 114, and 116 may be used to execute binaries, libraries, software applications, and other types of software code. For example, the guest OS 112 may execute binaries/libraries 118 and a first application ("app") 120, the guest OS 114 may execute binaries/libraries 122 and a second application 124, and the guest OS 116 may execute binaries/libraries 126 and a third application 128. A first VM 130 executing on the server 106 may include the guest OS 112, the binaries/libraries 118, and the first application 120. A second VM 132 executing on the server 106 may include the guest OS 114, the binaries/libraries 122, and the second application 124. A third VM 134 executing on the server 106 may include the guest OS 116, the binaries/libraries 126, and the third application 128.

A software container (e.g., Docker, Rocket, or similar container architecture) provides a layer of abstraction and resource isolation from the OS (e.g., Linux) to enable independent "containers" to execute within a single OS instance, thereby avoiding the overhead of starting virtual machines. For example, for the Linux OS, a container may isolate an application's view of the operating environment (e.g., process trees, network, user identifiers, mounted file systems, etc.) and from the application's view of resources (e.g., processors, memory, input/output (I/O), network resources, etc.). A container may be used to package an application and corresponding dependencies in a virtual container that can execute on any server (e.g., hardware server or virtual server), enabling flexibility and portability as to where the application can execute. A high-level application programming interface (API) may be used to provide containers with access to the underlying resources (e.g., host OS, physical hardware, etc.). Unlike a virtual machine, a container may not include a guest OS and instead access the host OS via the API. By using containers, resources are isolated, services restricted, and processes provisioned to have a compartmentalized view of the operating system, with each container having a process space, file system structure, network interface, etc. While multiple containers may share the same host OS, each container may be provisioned to use a pre-defined amount of resources, such as CPU, memory and I/O.

In the container architecture 104, software executes on the server 106 which comprises the underlying physical hardware. The host OS 108 is the operating system that executes on the server 106. An API 136 enables each container to access resources provided by the host OS 108 and the server 106. The API 136 may be proprietary to a particular type of container. For example, a first container format may use a first type of API, a second container format may use a second type of API, etc.

As illustrated in FIG. 1, a first container 138, a second container 140, and a third container 142 may execute on the host OS 108 and the server 106. Each of the containers 138, 140, and 142 may include one or more applications and binaries/libraries used by the applications. In some cases, each of the containers 138, 140, and 142 may be configured to execute one particular type of application. By doing so, the corresponding binaries/libraries 118, 122, and 126 may be configured for the particular type of application, thereby reducing the size of the binaries/libraries 118, 122, and 126 by not including binaries or libraries that are not used by the particular type of application.

Thus, multiple types of applications may be packaged in multiple containers, enabling each container to execute independently of other containers. In this way, containers can be migrated from executing on hardware located at the customer's premises to executing in a cloud facility. A cloud broker may benchmark a container executing in individual cloud environments from multiple cloud providers to identify a particular cloud environment for the container that provides the performance specified by the organization at the lowest price. As cloud provider's rates change, the independent nature of containers enables the cloud broker to move a particular container from one cloud provider to another cloud provider Moreover, the organization's various applications may be placed in containers such that the containers can be benchmarked. The benchmarks can be used to determine one or more cloud hosting facilities for the organization's applications that provides at least a particular level of performance at a lowest price. In some cases, the applications may be hosted by more than one cloud hosting facility.

Figure 2:
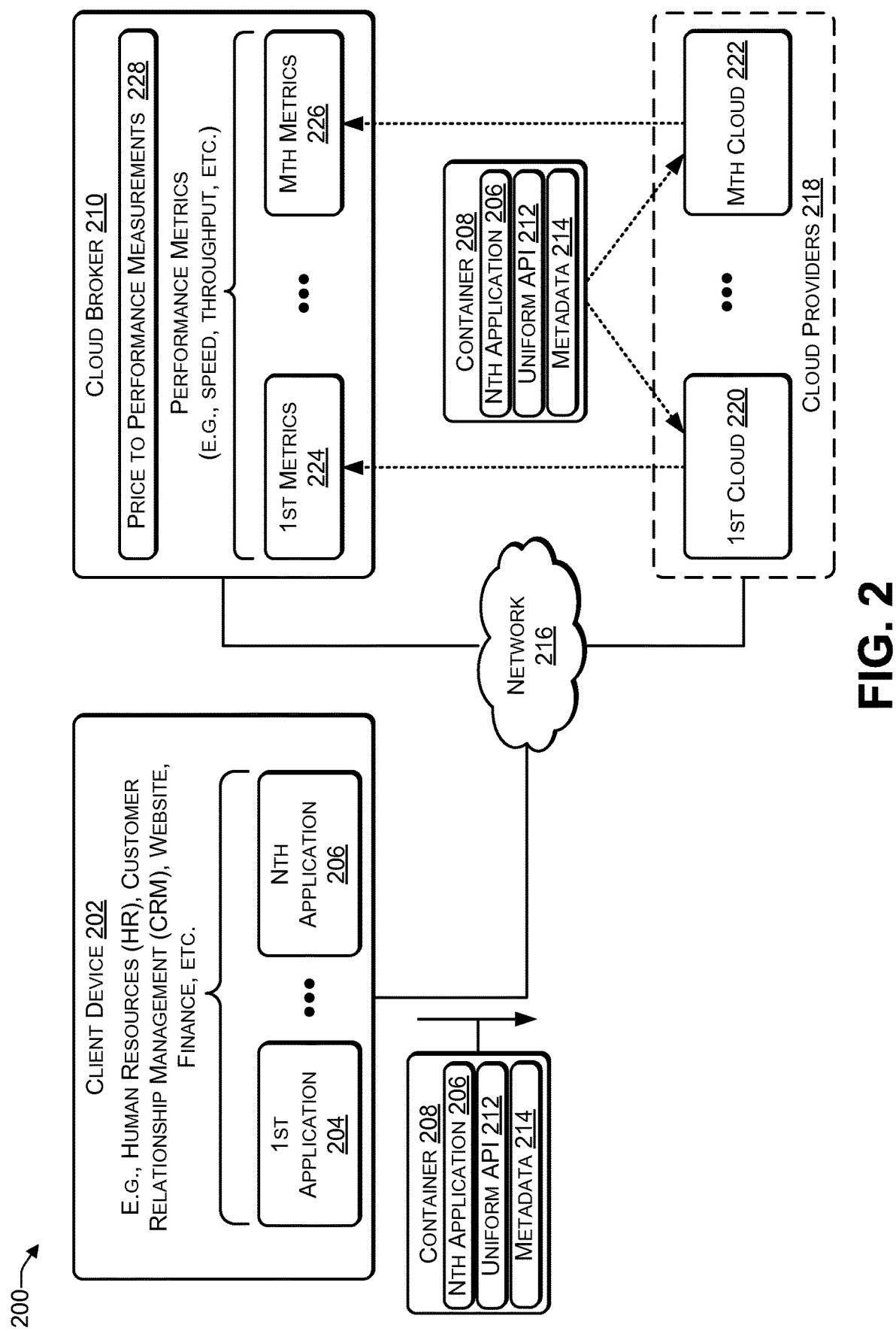
FIG. 2 is a block diagram illustrating an architecture that includes a cloud broker according to some embodiments.

FIG. 2 is a block diagram illustrating an architecture 200 that includes a cloud broker according to some embodiments. A client device 202 (e.g., associated with a customer, such as a business, an education institution, etc.) may be associated with a customer. The customer may use multiple software applications, such as a first application 204 to an Nth application 206 (where N>1). For example, the applications 204 to 206 may include software applications that provide various types of functionality, such as human resources (e.g., payroll), customer relationship management (CRM), website services (e.g., login authentication, account management, etc.), financial services (e.g., accounts receivable, accounts payable, etc.), micro services, and other type of software services.

To cost-effectively have the applications 204 to 206 hosted by a cloud hosting facility, the client device 202 may package individual software applications of the multiple software applications, such as the Nth application 206, in a container 208 and send the container 208 to a cloud broker 210 via a network 216. The cloud broker 210 may be full automated to perform testing and evaluation of containers, such as the container 208. The container 208 may include an application, such as then Nth application 206, a uniform API 212 (e.g., rather than a proprietary API such as the API 136), and metadata 214. In some cases, the cloud broker 210 may provide an API-to-API interface between the API 212 and a cloud hosting facility's proprietary API (e.g. the API 136 of FIG. 1) to enable the container 208 to be executed by different (e.g., more than one) cloud provider. For example, the cloud broker 210 may provide an API-to-API interface (or other mechanism) between the API 212 and a first proprietary API associated with the first cloud hosting facility 220 to enable the first cloud hosting facility 220 to execute the container 208. The metadata 214 may describe a predetermined (e.g., minimum) level of performance (e.g., number of CPU cores, network bandwidth, I/O speed, etc.) of a cloud hosting environment for the Nth application 206.

The network 216 may include both wired technologies (Ethernet, synchronous optical network (SONET), data over cable service interface specification (DOCSIS), and the like) and wireless technologies (e.g., Bluetooth, code division multiple access (CDMA), global system for mobile (GSM), universal mobile telephone service (UMTS) and the like.

The broker 210 may act as an intermediary to sell (e.g., based on the metrics) cloud hosting services provided by multiple cloud providers 218. For example, the broker 210 may receive a fee from one or more of the cloud providers 218 when the one or more cloud providers 218 are selected to host one or more of the applications 204 to 206. The fee may be a onetime fee or an ongoing fee (e.g., based on monthly or annual charges paid by the customer) and may be determined as a percentage of the cost of the cloud hosting, a flat fee, a graduated fee (e.g., 20% of the first $1000, 15% of the next $1000, etc.), or any combination thereof.

The broker 210 may receive the container 208 and execute the container 208 in one or more of the cloud providers 218, including a first cloud hosting facility 220 to an Mth cloud hosting facility 222 (where M>1 and M is not necessarily equal to N). Each of the cloud hosting facilities 220 to 222 may provide at least a level of performance as specified by the metadata 214 in the container 208. As the container 208 is executed by an individual cloud hosting facility of the cloud hosting facilities 220 to 222, the broker 210 may determine performance metrics (e.g., benchmarks), such as a first set of metrics 224 corresponding to the first cloud 220 executing the container 208 to an Mth set of metrics 226 corresponding to the Mth cloud 222 executing the container 208. The broker 210 may use the metrics 224 to 226 to determine (e.g., select) particular clouding hosting facilities to host particular applications.

The performance metrics 224 to 226 may include measurements relating to memory input/output (I/O) that identify how fast the memory in the cloud hosting facility can be written to and read from, a sustainable memory bandwidth (e.g., using the STREAM or similar benchmark), CPU speed, number of available CPU cores (e.g., as many software applications support multi-threading), processing power (e.g., floating point operations per seconds (FLOPS) using LINPACK or similar benchmark), disk I/O identifying how fast data storage can be accessed (e.g., using benchmarks such as Bonnie++, IOzone, or the like), file compression (e.g., using a benchmark such as BZIP2), network I/O (e.g., using benchmarks such as Iperf, MPPtest, etc.), resource contention, another metric, or any combination thereof. Cloud hosting facilities are typically multi-tenant and so the cloud provider may sell more than 100% of the physical capacity of the host physical device because individual tenants are unlikely to demand 100% capacity for a sustained period of time. However, if two or more tenants each demand a large amount of resources (e.g., CPU cycles, memory, bandwidth, or the like) substantially simultaneously; each tenant may end up in contention with the other tenants for resources, which may result in a delay in executing one or more software applications. A metric that measures resource contention may be useful for the client device 202 and the cloud broker 210 to determine realistic, expected performance for a particular cloud hosting facility.

Thus, the cloud broker 210 may receive containers, such as the container 208, from a client device (e.g., the client device 202) and execute each of the containers in one or more of the cloud providers 218 to determine performance metrics 224 to 226. The broker 210 may determine price to performance measurements 228 (e.g., price to performance ratios) for each container based on the performance metrics 224 to 226. In some cases, the broker 210 may determine that having a portion of the applications 204 to 206 hosted by one of the cloud providers 218 (e.g., the first cloud 220) and having a remainder of the applications 204 to 206 hosted by a different one of the cloud providers 218 (e.g., the Mth cloud 222) may be an arrangement that provides at least a particular level of performance at a lowest total price for a customer. For example, assume N=2 and the customer uses the first application 204 and the Nth (e.g., second) application 206. The broker 210 may determine (e.g., based on the metrics 224 to 226) that both the first cloud 220 and the Mth cloud 222 are providing at least a particular level of performance for the first application 204 and that the first cloud 220 is cheaper than the Mth cloud 222. The broker 210 may determine that (1) the Mth cloud 222 is capable of providing at least the particular level of performance for the Mth application 206 and that the first cloud 220 is not capable of providing the particular level of performance for the Mth application 206 or (2) that both the first cloud 220 and the Mth cloud 222 are providing at least the particular level of performance for the Mth application 206 and that the first cloud 220 is more expensive than the Mth cloud 222 for the Mth application 206. In this example, the broker 210 may recommend that the first cloud 220 host the first application 204 and recommend that the Mth cloud 222 host the Nth application 206. In some cases, the client device 202 may instruct the broker 210 to arrange for the applications 204 to 206 to be hosted based on the metrics 224 to 226. In such cases, the broker 210 may automatically (e.g., without human interaction) assign the applications 204 to 206 to be hosted by one or more of the cloud providers 218 based on the price to performance measurements 228. While the techniques and systems described herein are illustrated using examples of containers, the techniques and systems described herein may also be applied to other types of workloads, such as VMs.

Figure 3:
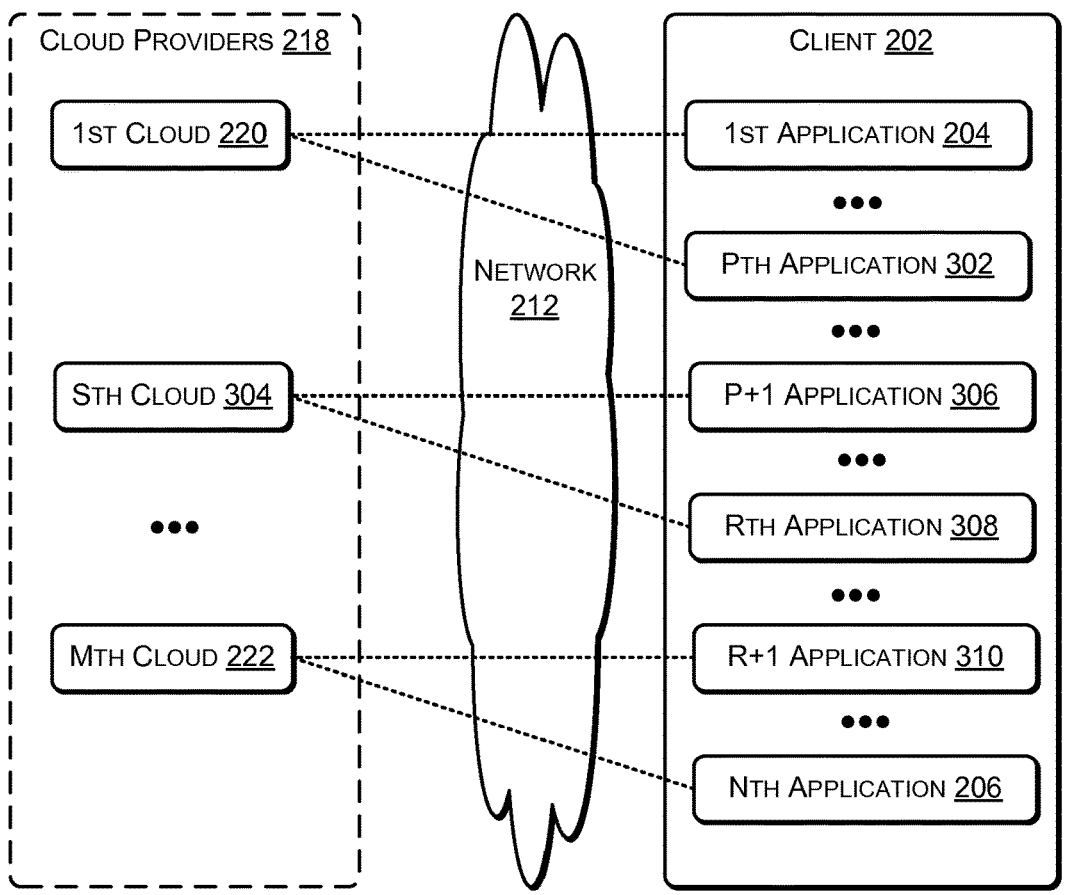
FIG. 3 illustrates an architecture in which multiple services are distributed among multiple cloud hosting services according to some embodiments.

FIG. 3 illustrates an architecture 300 in which multiple services are distributed among multiple cloud hosting services according to some embodiments. The cloud broker 210 may allocate the applications 204 to 206 to be hosted by one or more of the cloud providers 218 based on the price to performance measurements 228. For example, as illustrated in FIG. 3, the first cloud 220 (e.g., cloud hosting facility) may host the first application 204 up to a Pth application 302, an Sth cloud 304 may host a P+1st application 306 to an Rth application 308, and the Mth cloud 222 may host an R+1st application 310 to the Nth application 206 (where 1<S<M and 1<P<R<N).

The particular cloud providers 220, 304, 222 selected to host the particular applications 204, 302, 306, 308, 310, 206 may be selected because each cloud provider provides at least a pre-determined level of performance (e.g., specified by the client device 202, at a lowest price compared to other cloud providers, for the hosted application(s). For example, the first cloud 220 may provide at least a first pre-determined level of performance at a lowest price compared to a remainder of the cloud providers 218 for each of the applications 204 to 302. As another example, the Sth cloud 304 may provide at least a second pre-determined level of performance at a lowest price (e.g., compared to a remainder of the cloud providers 218) for each of the applications 306 to 308. As a further example, the Mth cloud 222 may provide at least a third pre-determined level of performance at a lowest price (e.g., compared to a remainder of the cloud providers 218) for each of the applications 310 to 206. In this way, a customer receives at least a specified level of performance for each hosted application at a lowest available price.

Figure 4:
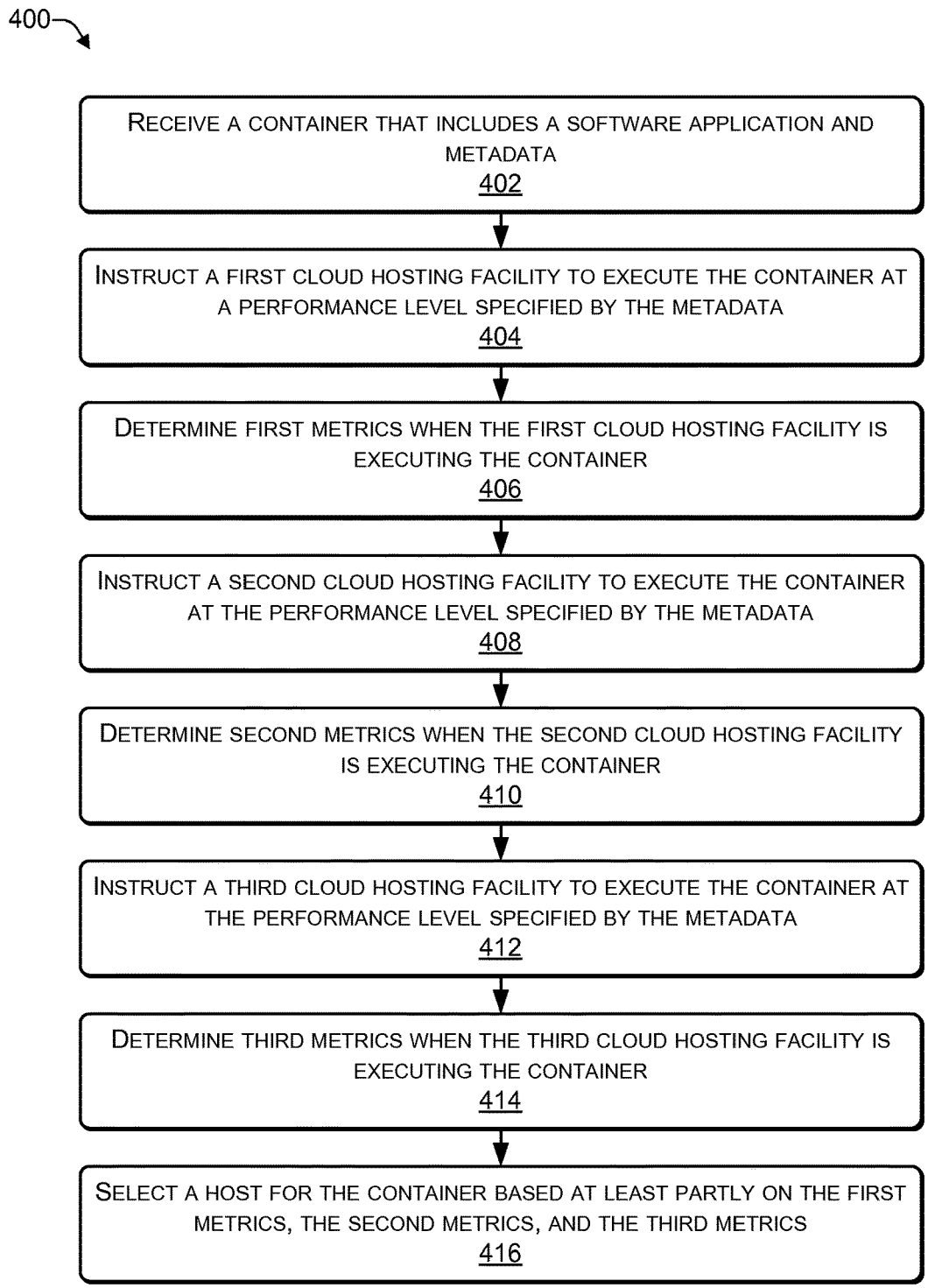
FIG. 4 is a flowchart of a process that includes receiving a container according to some embodiments.
Figure 5:
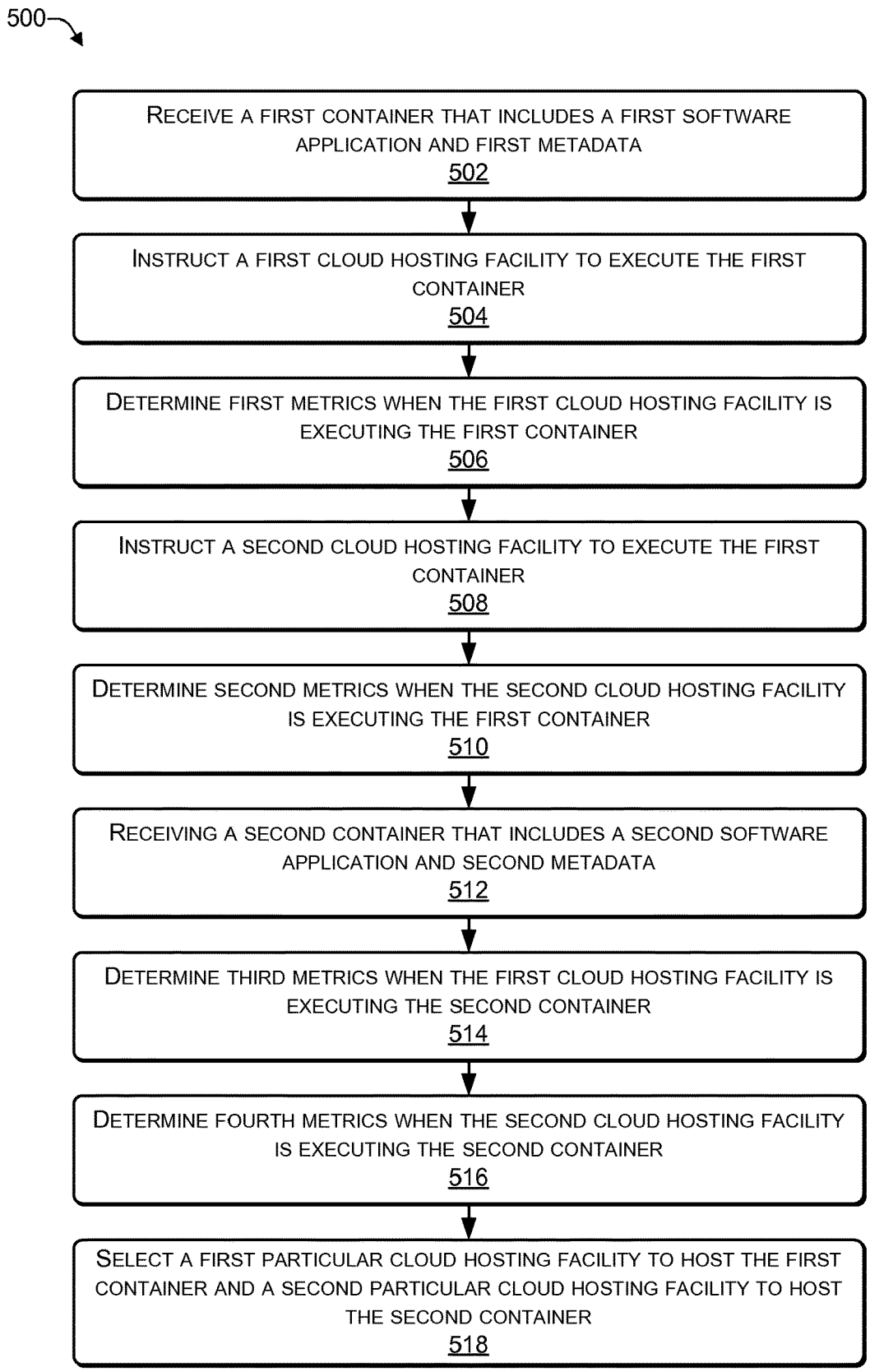
FIG. 5 is a flowchart of a process that includes determining metrics according to some embodiments.

In the flow diagrams of FIGS. 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIGS. 1-3, as described above, although other models, frameworks, systems and environments may implement these processes.

FIG. 4 is a flowchart of a process 400 that includes receiving a container according to some embodiments. The process 400 may be performed by the cloud broker 210 of FIGS. 2 and 3.

At 402, a container that includes a software application and metadata is received. For example, in FIG. 2, the broker 210 may receive the container 208 via the network 216.

At 404, a first cloud hosting facility is instructed to execute the container at a performance level specified by the metadata. At 406, first metrics are determined during the time that the first cloud hosting facility executes the container. At 408, a second cloud hosting facility is instructed to execute the container at the performance level specified by the metadata. At 410, second metrics are determined during the time that the second cloud hosting facility executes the container. At 412, a third cloud hosting facility is instructed to execute the container at the performance level specified by the metadata. At 414, third metrics are determined during the time that the third cloud hosting facility executes the container. For example, in FIG. 2, the broker 210 may instruct each of the cloud hosting facilities in turn, from the 1st cloud 220 to the Mth cloud 222, to execute the container 208. While each of the clouds 220 to 222 is executing the container 208, the broker 210 may gather corresponding metrics, such as one of the metrics 224 to 226.

At 416, a host is selected for the container based at least partly on the first metrics, the second metrics, and the third metrics. For example, in FIG. 2, the broker 210 may select one of the clouds 220 to 222 to host the container 208 based on the metrics 224 to 226.

Thus, a customer may user the client device 202 to send the container 208 to the broker 410. The broker 210 may instruct each of the cloud providers 218 to execute the container 208 and gather the metrics 224 to 226 when the container 208 is being executed. The broker 210 may use the metrics 224 to 226 to select one of the clouds 220 to 222 that provides at least the performance specified by the metadata 214 at a lowest price for that level of performance.

FIG. 5 is a flowchart of a process 500 that includes determining metrics according to some embodiments. The process 500 may be performed by the broker 210 (e.g., cloud broker) of FIGS. 2 and 3.

At 502, a first container that includes a first software application and first metadata is received. For example, in FIG. 2, the broker 210 may receive the container 208 via the network 216.

At 504, a first cloud hosting facility is instructed to execute the first container (e.g., at a first performance level specified by the first metadata). At 506, first metrics are determined during the time that the first cloud hosting facility executes the first container. At 508, a second cloud hosting facility is instructed to execute the first container. At 510, second metrics are determined during the time that the second cloud hosting facility executes the first container. For example, in FIG. 2, the cloud broker 210 may instruct each of the cloud hosting facilities in turn, from the 1st cloud 220 to the Mth cloud 222, to execute the container 208. When a particular cloud of the clouds 220 to 222 is executing the container 208, the cloud broker 210 may gather corresponding metrics, such as a particular set of metrics from the metrics 224 to 226.

At 512, a second container is received that includes a second software application and second metadata. At 514, third metrics are determined during the time that the first cloud hosting facility executes the second container (e.g., at a second performance level specified by the second metadata). At 516, fourth metrics are determined during the time that the second cloud hosting facility executes the second container (e.g., at the second performance level). For example, in FIG. 2, the cloud broker 210 may instruct each of the cloud hosting facilities in turn, from the 1st cloud 220 to the Mth cloud 222, to execute the container 208. When a particular cloud of the clouds 220 to 222 is executing the container 208, the cloud broker 210 may gather corresponding metrics, such as a particular set of metrics from the metrics 224 to 226.

At 518, a first particular cloud hosting facility (e.g., one of the clouds 220 to 222) is selected for the first container (e.g., based at least partly on the first metrics and the second metrics) and a second particular cloud hosting facility (e.g., one of the clouds 220 to 222) is selected for the second container (e.g., based at least partly on the third metrics and the fourth metrics). For example, in FIG. 2, the broker 210 may select one of the clouds 220 to 222 to host the container 208 based on the metrics 224 to 226.

Thus, the cloud broker 210 may receive the container 208 from the client device 202. The cloud broker 210 may instruct each of the cloud providers 218 in turn to execute the container 208 and gather the metrics 224 to 226 when the container 208 is being executed. The cloud broker 210 may use the metrics 224 to 226 to select one of the clouds 220 to 222 that provides at least the performance specified by the metadata 214 at a lowest price for that level of performance.

FIG. 6 is a flowchart of a process 600 that includes selecting a cloud hosting facility according to some embodiments. The process 600 may be performed by the broker 210 (e.g., cloud broker) of FIGS. 2 and 3.

At 602, a container that includes a first software application and first metadata is received. The first metadata may specify a minimum performance level (e.g., number of CPUs, number of cores, memory size, memory bandwidth, network I/O etc.) for executing the first software application. For example, in FIG. 2, the cloud broker 210 may receive the container 208 via the network 216.

At 604, first metrics are determined during the time that a first cloud hosting facility executes the first container. At 606, second metrics are determined during the time that a second cloud hosting facility executes the first container. For example, in FIG. 2, the cloud broker 210 may instruct each of the cloud hosting facilities in turn, from the 1st cloud 220 to the Mth cloud 222, to execute the container 208. When a particular cloud of the clouds 220 to 222 is executing the container 208, the cloud broker 210 may gather corresponding metrics, such as a particular set of metrics from the metrics 224 to 226.

At 608, a second container including a second application and second metadata is received. At 610, third metrics are determined during the time that the first cloud hosting facility executes the second container (e.g., at a second performance level specified by the second metadata). At 612, fourth metrics are determined during the time that the second cloud hosting facility executes the second container (e.g., at the second performance level). For example, in FIG. 2, the cloud broker 210 may instruct each of the cloud hosting facilities in turn, from the 1st cloud 220 to the Mth cloud 222, to execute the container 208. When a particular cloud of the clouds 220 to 222 is executing the container 208, the cloud broker 210 may gather corresponding metrics, such as a particular set of metrics from the metrics 224 to 226.

At 614, one of the first cloud hosting facility or the second cloud hosting facility is selected for the first container based at least partly on the first metrics, the second metrics, the third metrics, and the fourth metrics. At 616, one of the first cloud hosting facility or the second cloud hosting facility is selected for the second container based at least partly on the first metrics, the second metrics, the third metrics, and the fourth metrics. For example, in FIG. 2, the cloud broker 210 may select one of the clouds 220 to 222 to host the container 208 based on the metrics 224 to 226.

Thus, the cloud broker 210 may receive the container 208 from the client device 202. The cloud broker 210 may instruct each of the cloud providers 218 in turn to execute the container 208 and gather the metrics 224 to 226 when the container 208 is being executed. The cloud broker 210 may use the metrics 224 to 226 to select one of the clouds 220 to 222 that provides at least the performance specified by the metadata 214 at a lowest price among the cloud providers 218.

Figure 7:
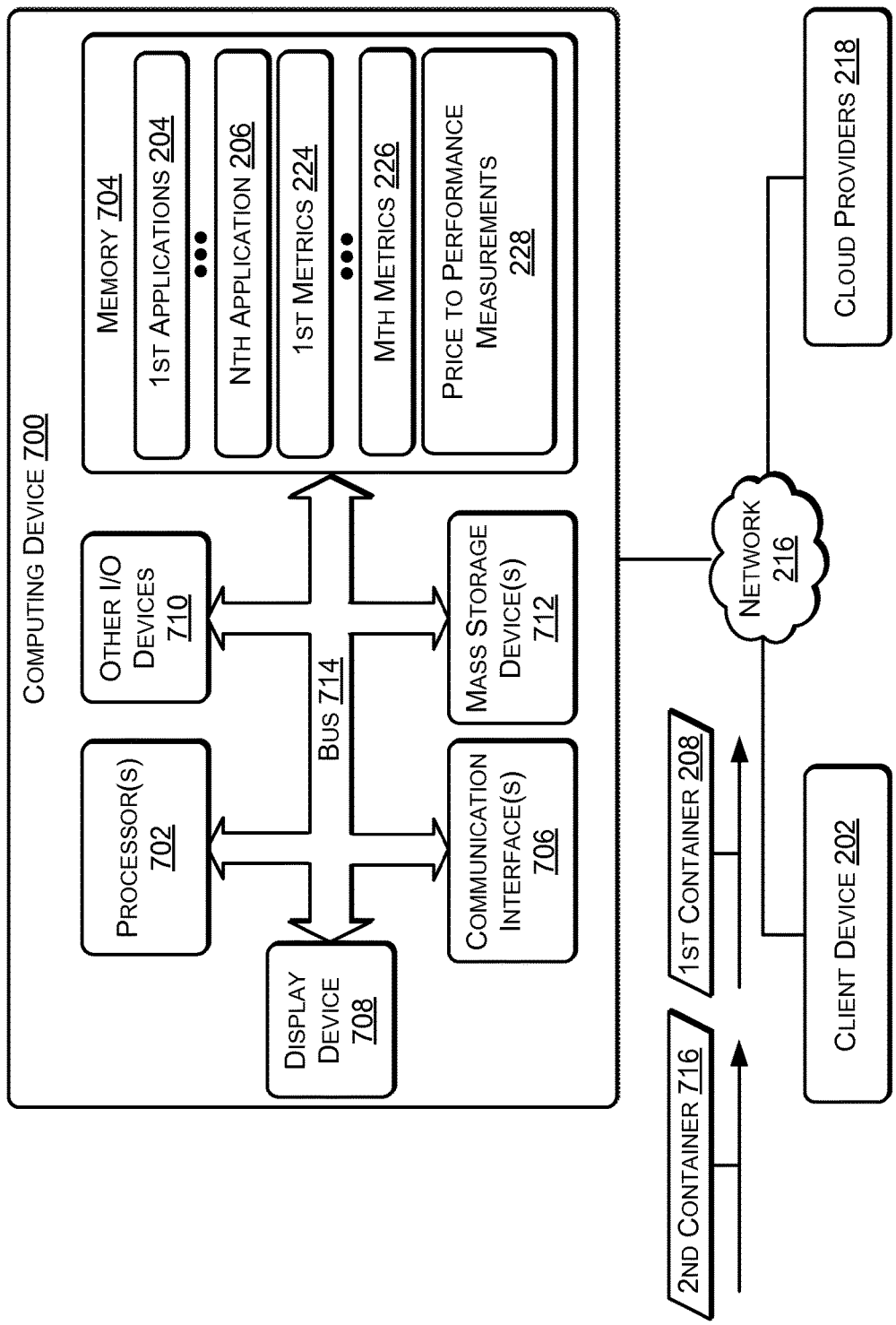
FIG. 7 illustrates an example configuration of a computing device that can be used to implement the systems and techniques described herein.

FIG. 7 illustrates an example configuration of a computing device 700 and environment that can be used to implement the modules and functions described herein. For example, the computing device 700 may be used to implement the cloud broker 210 of FIGS. 2 and 3. The computing device 700 may include at least one processor 702, a memory 704, communication interfaces 706, a display device 708, other input/output (I/O) devices 710, and one or more mass storage devices 712, configured to communicate with each other, such as via a system bus 714 or other suitable connection.

The processor 702 may be a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media for storing instructions which are executed by the processor 702 to perform the various functions described above. For example, memory 704 may generally include both volatile memory and non-volatile memory (e.g., RAM, ROM, or the like). Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a non-transitory media capable of storing computer-readable, processor-executable program instructions as computer program code that can be executed by the processor 702 as a particular machine configured for carrying out the operations and functions described in the implementations herein.

The computer storage media, such as memory 704 and mass storage devices 712, may be used to store software and data. The software may include the applications 204 to 206, the metrics 224 to 226, and price to performance measurements 228. The computing device 700 may be coupled to the client device 202 and the cloud providers 218 via the network 216. The client device may send at least a first container 208 and a second container 716 to the computing device 700 to determine the metrics 224 to 226. Each of the containers 208 to 716 may include an application that a customer associated with the client device 202 desires to have hosted by one of the cloud providers 218.

The computing device 700 may also include one or more communication interfaces 706 for exchanging data with the client device 202 and the cloud providers 218, such as via the network 216, direct connection, or the like, as discussed above. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 706 can also provide communication with external storage (not shown), such as in a storage array, network attached storage, storage area network, or the like.

A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

Memory 704 may include modules and components for improved Huffman decoding according to the implementations herein. Memory 704 may also include other data and data structures described herein. Memory 704 may further include one or more other software modules, such as an operating system, drivers, communication software, or the like. Memory 704 may also include other data, such as data stored while performing the functions described above and data used by the other modules.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
   receiving, at a cloud broker from a client device, a container that includes a software application and metadata, the software application including a first service and a second service, wherein the container further includes a process space, a file system structure, and a network interface that are specific to the container;
   instructing, by the cloud broker, a first cloud hosting facility to execute the container including the first service and the second service of the software application at a performance level specified by the metadata included in the container;
   determining, by the cloud broker, first execution metrics associated with the first cloud hosting facility during execution of the container including the first service and the second service of the software application by the first cloud hosting facility;
   instructing, by the cloud broker, a second cloud hosting facility to execute the container including the first service and the second service of the software application at the performance level, wherein the first cloud facility is operated by a different entity than the second cloud hosting facility;
   determining, by the cloud broker, second execution metrics associated with the second cloud hosting facility during the execution of the container including the first service and the second service of the software application by the second cloud hosting facility;
   selecting, by the cloud broker, the first cloud hosting facility to host the first service of the software application of the container based at least partly on the first execution metrics and the second execution metrics; and
   selecting, by the cloud broker, the second cloud hosting facility to host the second service of the software application based at least partly on the first execution metrics and the second execution metrics.

2. The computer-implemented method of claim 1, wherein the container includes an application programming interface that is adaptable by the cloud broker to enable the first cloud hosting facility to execute the first service of the software application and adaptable to enable the second cloud hosting facility to execute the second service of the software application.

3. The computer-implemented method of claim 1, further comprising:
receiving, from the client device, a second container that includes a second software application and second metadata;
determining third execution metrics during the execution of the second container by the first cloud hosting facility;
determining fourth execution metrics during the execution of the second container by the second cloud hosting facility; and
selecting a second particular cloud hosting facility to host the second container based at least partly on the third execution metrics and the fourth execution metrics.

4. The computer-implemented method of claim 1, further comprising:
instructing a third cloud hosting facility to execute the software application at the performance level;
determining third execution metrics associated with the third cloud hosting facility during the execution of the software application by the third cloud hosting facility; and
selecting the first cloud hosting facility to host the first service of the software application based at least partly on the first execution metrics, the second execution metrics, and the third execution metrics.

5. The computer-implemented method of claim 4, wherein the particular cloud hosting facility is one of the first cloud hosting facility, the second cloud hosting facility, or the third cloud hosting facility.

6. The computer-implemented method of claim 1, wherein the first service of the application comprises at least one of a human resources service, a customer relationship management service, website service, or a financial service.

7. The computer-implemented method of claim 1, wherein the container is based on at least one of Docker, Rocket, Warden, or Garden.

8. The computer-implemented method of claim 1, wherein an operating system of the container comprises a Linux-based operating system.

9. One or more non-transitory computer-readable media comprising instructions that are executable by one or more processors to perform operations comprising:
receiving, from a client device, a first container that includes a software application and metadata, the software application including a first service and a second service, wherein the first container further includes a first process space, a first file system structure, and a first network interface that are specific to the first container;
instructing a first cloud hosting facility to execute the first container including the first service and the second service of the software application at a minimum performance level specified by the metadata included in the first container;
determining first execution metrics during execution of the first container including the first service and the second service of the software application by the first cloud hosting facility;
instructing a second cloud hosting facility to execute the container including the first service and the second service of the software application at the minimum performance level specified by the metadata included in the first container;
determining second execution metrics during the execution of the first container including the first service and the second service of the software application by the second cloud hosting facility;
selecting the first cloud hosting facility to host the first service of the software application based at least partly on the first execution metrics and the second execution metrics; and
selecting the second cloud hosting facility to host the second service of the software application based at least partly on the first execution metrics and the second execution metrics.

10. The one or more non-transitory computer-readable media of claim 9, further comprising:
receiving, from the client device, a second container that includes a second software application and second metadata;
determining third execution metrics during the execution of the second container by the first cloud hosting facility;
determining fourth execution metrics during the execution of the second container by the second cloud hosting facility; and
selecting a second particular cloud hosting facility to host the second container based at least partly on the third execution metrics and the fourth execution metrics.

11. The one or more non-transitory computer-readable media of claim 10, wherein:
the first cloud hosting facility is selected to host the first container; and
the second cloud hosting facility is selected to host the second software application.

12. The one or more non-transitory computer-readable media of claim 9, wherein the first service of the software application comprises at least one of a human resources service, a customer relationship management service, website service, or a financial service.

13. The one or more non-transitory computer-readable media of claim 9, wherein the first container includes an application programming interface that is adaptable to enable at least the first cloud hosting facility and the second cloud hosting facility to execute the software application.

14. A computing device, comprising:
one or more processors; and
one or more non-transitory computer-readable media storing instructions that are executable by the one or more processors to perform operations comprising:
receiving, from a client device, a first container that includes a software application and metadata, the software application including a first service and a second service, wherein the first container further includes a first process space, a first file system structure, and a first network interface that are specific to the first container;
instructing a first cloud hosting facility to execute the first container including the first service and the second service of the application at a minimum performance level specified by the metadata included in the first container;

determining first execution metrics during execution of the first container including the first service and the second service of the application by the first cloud hosting facility;

instructing a second cloud hosting facility to execute the container including the first service and the second service of the application at the minimum performance level specified by the metadata included in the first container;

determining second execution metrics during the execution of the first service and the second service of the container including the first application by the second cloud hosting facility;

selecting a particular cloud hosting facility to host the first service of the software application based at least partly on the first execution metrics and the second execution metrics; and selecting the second cloud hosting facility to host the second service of the software application based at least partly on the first execution metrics and the second execution metrics.

15. The computing device of claim 14, further comprising:

receiving, from the client device, a second container that includes a second software application and second metadata;

determining third execution metrics during the execution of the second container by the first cloud hosting facility; and determining fourth execution metrics during the execution of the second container by the second cloud hosting facility.

16. The computing device of claim 15, wherein selecting the particular cloud hosting facility to host the first software application comprises:

selecting one of the first cloud hosting facility or the second cloud hosting facility to host the first service or the second service of the first software application based at least partly on the first execution metrics, the second execution metrics, the third execution metrics, and the fourth execution metrics.

17. The computing device of claim 15, further comprising:

selecting one of the first cloud hosting facility or the second cloud hosting facility to host the second container based at least partly on the first execution metrics, the second execution metrics, the third execution metrics, and the fourth execution metrics.

18. The computing device of claim 15, wherein the second container includes an application programming interface that enables at least the first cloud hosting facility and the second cloud hosting facility to execute the second software application.

19. The computing device of claim 14, wherein the first container includes an application programming interface that is adaptable to enable at least the first cloud hosting facility and the second cloud hosting facility to execute the first service and the second service of the first software application.

20. The computing device of claim 14, wherein the first service of the software application comprises at least one of a human resources service, a customer relationship management service, website service, or a financial service.

* * * * *